Re. 24,496

United States Patent Office 2,742,451
Patented Apr. 17, 1956

2,742,451

METHOD OF POLYCONDENSING DIGLYCOL ESTERS OF TEREPHTHALIC ACID

Erwin Heisenberg, Erlenbach (Main), and Anton Watzl, Kleinwallstadt (Main), Germany, assignors to Vereinigte Glanzstoff-Fabriken A. G., Wuppertal-Elberfeld, Germany, a corporation of Germany No Drawing. Application August 2, 1954,
Serial No. 447,386

Claims priority, application Germany August 3, 1953

9 Claims. (Cl. 260—75)

This invention relates to the manufacture of polycondensates from diglycol esters of terephthalic acid; and in particular is directed to such manufacture in molten flow.

It is known that polyethylene terephthalate is obtained by the conversion of the glycol ester of terephthalic acid. Such conversion requires the removal of the excess glycol toward the end of the reaction. This removal is effectuated by applying vacuum or using inert gases, as for example nitrogen.

In the latter case the gases are conducted over or through the melt. It has been found, however, that the removal of the split off glycol takes place slowly and incompletely even if large quantities, for example nitrogen, are used. Therefore the products thus obtained are insufficiently condensed and accordingly possess insufficient resistance to tearing, when they are fabricated into films or fibers. According to one of the known methods it has been proposed that the condensation of polyethylene terephthalate be carried out only under vacuum in order to remove entirely all of the separate glycol. The basis therefor is that without the application of vacuum only polycondensates having a low molecular weight are obtainable; and the fibers produced therefrom are brittle.

The use of nitrogen as an inert gas is marked by substantial disadvantages. Nitrogen contains small but difficult to remove quantities of oxygen which adversely acts upon the developing polycondensate even in low concentration. Furthermore, nitrogen has a poor heat capacity and accordingly the nitrogen must be very carefully isolated against the loss of heat.

It has been discovered that the removal of the split off glycol takes place appreciably faster than when nitrogen or similar gases are used and that completely condensed products, without the application of vacuum, can be obtained when vapors of paraffin hydrocarbons or of aromatic or hydro-aromatic compounds which contain no functional groups (hence are inert) are led through the melt.

These vapors are heated to temperatures of 170° to 250° C., preferably 200° C., and are introduced into the melt which is heated to a temperature of from 260° to 270° C.

It is also possible to carry out the action in a continuous process when the vapors are introduced countercurrent the developing condensate. For this purpose, the reaction mixture after being freed or stripped of methanol and most of the excess glycol, is forced under pressure into a reaction vessel, preferably by means of a nozzle so that the mixture enters the vessel in the form of a plurality of thin streams. It collects on the bottom of the vessel and is pumped therefrom again to the nozzle through which it is repressed, etc. At the same time, a stream of vaporized benzene, for example, passes along the liquid threads. To operate continuously, a small quantity of the reaction material freed from methanol and most of the glycol is continuously added while the condensation product discharges continuously from a point below the reaction vessel.

During this operation the mixture is continuously recycled by pumping while the benzene vapor is conducted from the reaction vessel. The continuously discharging condensation product has a considerably higher degree of polycondensation than does the introduced product but it must be led once more through the same or a similar apparatus to effectuate the condensation to the desired final degree. Two or more pieces of apparatus may be connected in series. The following paraffin hydrocarbons and aromatic or hydroaromatic compounds have been found suitable in carrying out this invention, to wit, undecane and similar homologs, benzene, toluene, xylene, cyclohexane, and others. In contrast to nitrogen, the employment of these compounds provides the following advantages: these compounds can be liberated without any difficulty from any salts present or oxygen, contained therein, and can easily be recovered after use. Furthermore, these compounds have a considerably higher heat capacity than nitrogen for example. Hence when they are heated prior to the introduction into the reaction vessel, they retain the higher temperature for a considerably longer period than does nitrogen.

The instant invention provides, in contrast to the usual vacuum method, the further advantage that the break-in or penetration of small quantities of oxygen into the apparatus is completely eliminated or avoided. It is exceedingly difficult to avoid the penetration of oxygen when the vacuum method is employed. As is well known, even the smallest quantities of oxygen arising from such penetration result in a discoloration of the condensate.

The following are examples of this invention.

*Example 1*

20 grams of dimethyl terephthalate are transesterified in the usual manner with 10 grams of ethylene glycol, with the addition of a zinc oxide-boron trioxide-catalyst, until the methanol separation is completed (time requirement being about 2 hours).

Pure benzene vapor having a temperature of 185° C. is passed for 6 hours through the thus obtained transesterified product, the temperature of which is elevated to 250° C. and which is maintained under vigorous stirring. During this operation the melt becomes continuously tougher.

The end product thus obtained has a melting point of 249° C. and shows excellent fiber or thread forming properties at K values of about 49 to 50.

In contrast thereto the use of nitrogen produces the following results.

20 grams of dimethyl terephthalate were transesterified with 10 grams of ethylene glycol as previously described, following which most of the excess ethylene glycol was removed by distillation. A current of nitrogen heated to 160° C. was conducted for 10 hours through the transesterified product obtained (heated to 250° C.) and which was maintained under vigorous stirring. The end product thereby produced had a melting point of 248° C. and exhibited unsatisfactory fiber forming properties at K values of 29.5 to 31.1.

This comparative test shows that the use of nitrogen as an insert gas requires considerably longer processing time (10 hours) and produced inferior polycondensates having low K values (29.5–31.1).

*Example 2*

20 grams of dimethyl terephthalate were transesterified as described in Example 1 and most of the excess glycol removed by distillation. During the subsequent condensation a current of gaseous decahydronaphthalene at a temperature of 190° C. and flowing at velocity of 12 liters per hour, was directed for 6 hours through the reaction mixture, the temperature of which had been elevated to 270° C. and which was maintained under vigorous stirring. A pure white end product was obtained having excellent fiber forming properties. The melting point thereof was 249° C. and it had a K value 48–49 (in 1 percent m-cresol solution).

*Example 3*

60 grams of dimethyl terephthalate, after transesterification with 38.4 grams of ethylene glycol were condensed as described in the previous examples. A current of gaseous cyclohexane heated to 195° C. and flowing at a velocity of 35 liters per hour was conducted through the reaction mixture. During the condensation interval of 7 hours, 485 cc. of cyclohexane was volatilized and recovered.

The pure white polyethylene terephthalate showed excellent fiber forming properties and had a melting point of 249° C. and a K value of 48.5.

We claim:

1. Process of polycondensing molten diglycol terephthalate which comprises conducting a current of vapours of the group consisting of inert paraffin hydrocarbons and aromatic and hydro-aromatic hydrocarbons, the vapors having a temperature of from 170° to 250° C., through the molten ester.

2. Process of polycondensing flowing molten diglycol terephthalate which comprises conducting a current of the vapors of the group consisting of inert paraffin hydrocarbons and aromatic and hydro-aromatic hydrocarbons, the vapors having a temperature of from 170° to 250° C., through the molten flowing ester.

3. Continuous process in accordance with claim 2 wherein the vapors are introduced countercurrent the flow of the molten diglycol terephthalate developing into the condensate thereof.

4. Process in accordance with claim 1 wherein the vapors are those of benzene.

5. Process in accordance with claim 2 wherein the vapors are those of benzene.

6. Process in accordance with claim 1 wherein the vapors are those of decahydronaphthalene.

7. Process in accordance with claim 2 wherein the vapors are those of decahydronaphthalene.

8. Continuous process in accordance with claim 2 wherein vapors of benzene are introduced countercurrent the flow of the molten diglycol terephthalate developing into the condensate thereof.

9. Continuous process in accordance with claim 2 wherein vapors of decahydronaphthalene are introduced countercurrent the flow of the molten diglycol terephthalate developing into the condensate thereof.

No references cited.